Figure 1:
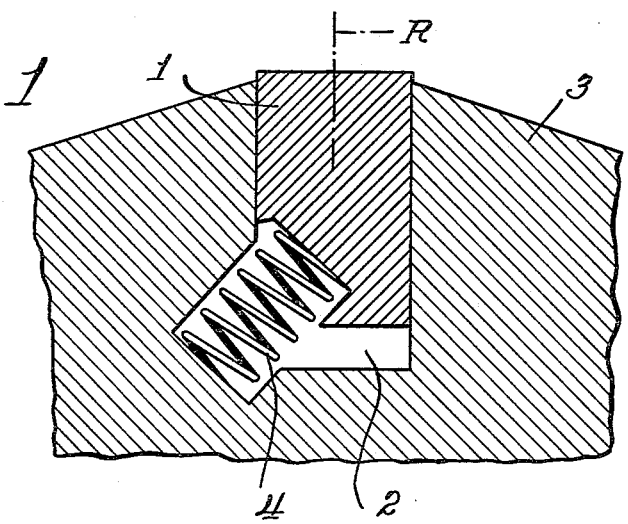

Jan. 21, 1964  E. FUHRMANN  3,118,595

SEALING ROTARY PISTON ENGINE

Filed Dec. 11, 1961

INVENTOR.
Ernst Fuhrmann
BY
Atty.

United States Patent Office 3,118,595
Patented Jan. 21, 1964

3,118,595
SEALING ROTARY PISTON ENGINE
Ernst Fuhrmann, Burscheid, near Cologne, Germany, assignor to Goetzewerke Friedrich Goetze Aktiengesellschaft, Burscheid, near Cologne, Germany, a corporation of Germany
Filed Dec. 11, 1961, Ser. No. 158,435
Claims priority, application Germany Dec. 24, 1960
3 Claims. (Cl. 230—145)

This invention relates to rotary piston engines and is particularly concerned with a sealing device for such an engine, comprising, if desired, a plurality of sealing bars disposed respectively in grooves formed in the piston.

It is known to seal the piston of a rotary piston engine with respect to the cylinder by means of bars disposed peripherally of the piston. In order to obtain sealing engagement of these sealing bars with the wall of the cylinder even at low speed of revolution of the piston, springs have been placed in back of the sealing bars for biasing them radially toward the cylinder wall in sealing engagement therewith. However, it has not always been possible until now, despite this radially directed spring bias, to equalize or compensate the play of a bar within its groove, which necessarily results in the fabrication, so that fluttering of the sealing bars occurred unavoidably particularly at high speed of revolution.

In order to overcome this drawback, it is in accordance with the invention proposed to press the respective sealing bars in tangential direction against the corresponding groove flanks by means of spring force applied thereto. It is entirely feasible to apply the spring force which operates in tangential direction so that it also exerts a radial force of the respective sealing bar, thus exerting on the sealing bar tangential as well as radial pressure by one and the same spring element.

The sealing bars are at high speed of revolution pressed against the cylinder wall by the centrifugal force, so that a further spring biasing may be omitted at such high speeds. It is accordingly further proposed to cancel at increasing speed of revolution the radial force component of the spring bias. This is in simple manner obtained, for example, by arranging the corresponding spring in a plane extending obliquely to the radial plane and arranging the end thereof, which rests against the piston, with sufficient play to relieve it of the load of centrifugal force, while securing the other end against radial displacement by an abutment on the piston. The springs are advantageously provided within recesses formed respectively in the piston and the sealing bar. In another embodiment, the radially effective component of the biasing spring means is cancelled at high speed of revolution of the piston, by the action of a lever arm which is in engagement with one end of a radially effective biasing spring.

Further details and features of the invention will appear from the description of embodiments thereof which is rendered below with reference to the accompanying drawing.

Figure 2:
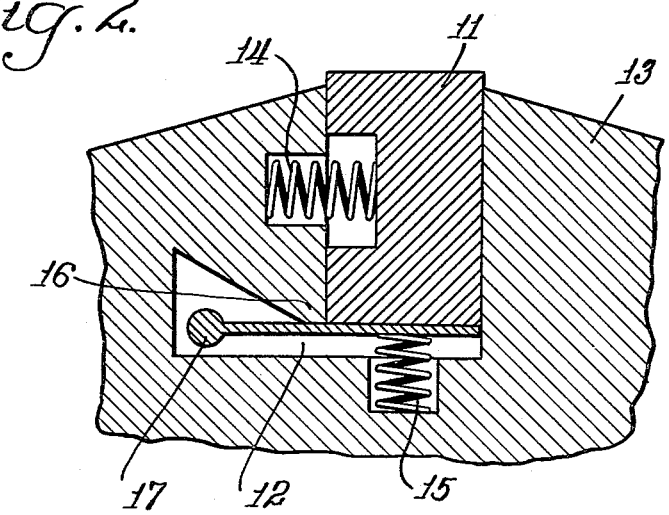

FIG. 1 shows part of a piston having a sealing bar biased by an obliquely arranged spring; and FIG. 2 shows part of a piston provided with a sealing bar biased radially and a spring, the action of which is cancelled at high piston speed and biased tangentially by an auxiliary spring.

The sealing bar 1 shown in FIG. 1 is movably disposed within the groove 2 of the piston 3 and is pressed against its neighboring surfaces in radial as well as in tangential direction by the spring 4 which is disposed obliquely to the radial plane extending in the direction R. The radial bias component of the spring 4 ceases to be effective at high speed of revolution of the piston owing to placement of such spring as previously explained.

The sealing bar 11 shown in FIG. 2 is positioned within a radial groove 12 formed in the piston 13, but the radial and tangential spring bias is in this arrangement subdivided, employing a tangentially acting spring 14 positioned in a lateral recess extending from the radial groove formed in the piston 13 and a radially acting spring 15 arranged at the bottom of the groove 12. The action of the spring 15 is effective only at relatively low speed of revolution of the piston. At higher speed of revolution, the sealing bar 11 will be effected by centrifugal force, pressing it in sealing engagement with the cylinder wall, and the radial biasing action of the spring 15 will cease as it abuts against a lever pivoted at 17 which engages the edge 16 of the radial groove 12. The sealing bar 11 is thus at higher speed of revolution of the piston held in sealing engagement with the cylinder wall only by the action of centrifugal force while the action of the tangential bias spring 14 continues.

Changes may be made within the scope and spirit of the appended claims which define what is believed to be new and desired to have protected by Letters Patent.

I claim:

1. A device for sealing the piston of a rotary piston engine, comprising at least one sealing bar provided in a radial groove formed in the piston, and spring means operatively disposed between said piston and sealing bar for exerting on the latter respectively a radially effective force operative to hold the free end of such sealing bar in sealing engagement with the wall of the cylinder and a tangentially effective force which is effective to press said sealing bar against the flanks of said radial groove, said spring means being constructed to have a limited spring movement with respect to the radially effective force thereof whereby such force is cancelled by the action of centrifugal force acting on the sealing bar.

2. A sealing device according to claim 1, wherein said spring means comprises a single spring having its axis disposed at an angle to the direction of movement of said sealing bar, operative to exert both tangential and radial pressure on said sealing bar, said spring having a length to provide sufficient play to relieve it of the load of centrifugal force.

3. A sealing device according to claim 1, wherein said spring means comprises two springs, one of which is operatively disposed between said piston and sealing bar to exert a tangential force on the latter, and the other spring being operatively disposed between said piston and sealing bar to exert a radial force on the latter, and a pivoted lever disposed between said last mentioned spring and the sealing bar, said lever being constructed to engage a portion of said piston, at higher speeds of revolution, operative to relieve the force exerted by said spring on said sealing bar.

References Cited in the file of this patent
UNITED STATES PATENTS

| 488,517 | Clements et al. | May 2, 1905 |
| 1,997,184 | Ruehman | Apr. 9, 1935 |
| 2,708,884 | Deschamps | May 24, 1955 |
| 2,977,888 | Livermore | Apr. 4, 1961 |

FOREIGN PATENTS

| 553,569 | France | May 25, 1923 |